United States Patent
Eastman

[19]

[11] Patent Number: 5,951,429
[45] Date of Patent: Sep. 14, 1999

[54] SYNCHRONIZED RANGE SHIFT MECHANISM FOR TRANSFER CASE

[75] Inventor: Richard E. Eastman, Central Square, N.Y.

[73] Assignee: New Venture Gear, Inc., Troy, Mich.

[21] Appl. No.: 09/120,432

[22] Filed: Jul. 22, 1998

Related U.S. Application Data

[60] Provisional application No. 60/078,216, Mar. 16, 1998.

[51] Int. Cl.[6] .................................................. F16H 37/08
[52] U.S. Cl. ........................................... 475/204; 475/206
[58] Field of Search .................................. 475/204, 206, 475/198, 248; 180/247, 248

[56] References Cited

U.S. PATENT DOCUMENTS

| | | |
|---|---|---|
| 4,569,252 | 2/1986 | Harper . |
| 4,770,280 | 9/1988 | Frost . |
| 5,054,335 | 10/1991 | Andrews . |
| 5,105,902 | 4/1992 | Wilson et al. . |
| 5,284,068 | 2/1994 | Frost . |
| 5,334,116 | 8/1994 | Baxter, Jr. ................................ 475/204 |
| 5,346,442 | 9/1994 | Eastman . |
| 5,443,429 | 8/1995 | Baxter, Jr. ................................ 475/204 |
| 5,651,749 | 7/1997 | Wilson et al. . |
| 5,655,986 | 8/1997 | Wilson et al. . |
| 5,697,861 | 12/1997 | Wilson . |
| 5,700,222 | 12/1997 | Bowen ............................... 475/198 X |
| 5,702,321 | 12/1997 | Bakowski et al. . |
| 5,704,863 | 1/1998 | Zalewski et al. ................... 475/206 X |
| 5,704,867 | 1/1998 | Bowen . |
| 5,720,688 | 2/1998 | Wilson et al. ....................... 475/204 X |
| 5,738,604 | 4/1998 | Dick ....................................... 475/206 |
| 5,836,847 | 11/1998 | Pritchard ............................. 475/198 X |

FOREIGN PATENT DOCUMENTS

9010806   9/1990   European Pat. Off. .

*Primary Examiner*—Dirk Wright
*Assistant Examiner*—Peter T. Kwon
*Attorney, Agent, or Firm*—Harness, Dickey & Pierce, P.L.C.

[57] ABSTRACT

A transfer case for a four-wheel drive vehicle having a planetary gear assembly and a synchronized range clutch which can be selectively shifted on-the-move for establishing four-wheel high-range and low-range drive modes.

19 Claims, 7 Drawing Sheets

| DRIVE MODE | RANGE SLEEVE | MODE SLEEVE |
|---|---|---|
| TWO-WHEEL LOW-RANGE | L | 2WD |
| TWO-WHEEL HIGH-RANGE | H | 2WD |
| LOCKED FOUR-WHEEL HIGH-RANGE | H | 4LOCK |
| LOCKED FOUR-WHEEL LOW-RANGE | L | 4LOCK |
| FULL-TIME FOUR-WHEEL LOW-RANGE | L | 4DIFF |
| FULL-TIME FOUR-WHEEL HIGH-RANGE | H | 4DIFF |
| NEUTRAL | N | 4DIFF |

SYNCHRONIZED RANGE SHIFT MECHANISM FOR TRANSFER CASE

This application claims benefit of provisional application Ser. No. 60/078,216, filed Mar. 16, 1998.

BACKGROUND OF THE INVENTION

The present invention relates generally to transfer cases for use in four-wheel drive vehicles. More particularly, the present invention relates to a transfer case having a synchronized range shift mechanism for on-the-move shifting between high-range and low-range drive modes.

The drivetrain in many light-duty and sport-utility vehicles includes a transfer case for transmitting drive torque to all four of the wheels, thereby establishing a four-wheel drive mode of operation. To accommodate differing road surfaces and conditions, some transfer cases are equipped with a gear reduction unit which can be selectively shifted by the vehicle operator to establish four-wheel high-range and low-range drive modes. In many instances, however, the vehicle must be stopped before the transfer case can be shifted between its four-wheel high-range and low-range drive modes. Unfortunately, the need to stop the vehicle prior to such range shifting is inconvenient, particularly upon encountering road conditions or surface terrains where continuation of the vehicle's rolling momentum would assist in overcoming the conditions encountered. As such, some gear reduction units are adapted to permit the vehicle operator to shift from the four-wheel low-range drive mode into the four-wheel high-range drive mode without stopping the vehicle. For example, U.S. Pat. No. 5,054,335 discloses a transfer case equipped with a synchronized range shift arrangement for on-the-move shifting of a layshaft-type gear reduction unit. Alternatively, commonly-owned U.S. Pat. No. 5,346,442 discloses a transfer case having a synchronized range shift arrangement for on-the-move shifting of a planetary-type gear reduction unit. Finally, U.S. Pat. Nos. 4,569,252, 5,651,749, 5,655,986, 5,697,861 and 5,704,867 disclose transfer cases equipped with planetary-type gear reduction units which permit synchronized shifting between the high-range and low-range drive modes. Thus, a recognized need exists to develop synchronized range shift systems for use in four-wheel drive transfer cases that advance the current technology.

SUMMARY OF THE INVENTION

It is therefore an object of the present invention to provide a transfer case for a four-wheel drive vehicle having a planetary gear assembly and a range shift mechanism which can be selectively actuated for establishing a four-wheel high-range drive mode, a neutral mode, and a four-wheel low-range drive mode.

As a related object of the present invention, the range shift mechanism includes synchronizers for permitting "on-the-move" shifting of the transfer case between the four-wheel high-range and low-range drive modes.

According to a preferred embodiment of the present invention, the planetary gear assembly is operably installed between an input member and an output member and includes a stationary ring gear, a sun gear fixed for rotation with the input member, and a set of pinion gears meshed with the ring gear and sun gear and which are rotatably supported from a planet carrier. The synchronized range shift mechanism includes a range sleeve coupled for rotation with the output member and movable between first and second range positions to respectively establish first and second drive connections between the input member and the output member. To establish the first drive connection, the range sleeve is moved into engagement with a clutch ring fixed for rotation with the input member, whereby the output member is driven by the input member at a first speed ratio to define a high-range drive mode. To establish the second drive connection, the range sleeve is moved into engagement with the planet carrier, whereby the output member is driven by the input member at a second speed ratio to define a low-range drive mode. The range sleeve is further operable in a third range position whereat it is uncoupled from the clutch ring and the planet carrier to disconnect the output member from the input member and establish a Neutral non-driven mode.

As an additional feature of the present invention, the transfer case can be equipped with an interaxle differential for providing a full-time four-wheel drive mode. As a further option, a biasing clutch can be provided for limiting speed differentiation and controlling the torque distribution between the front and rear output shafts.

According to yet another feature, the transfer case can be equipped with a transfer clutch for transferring drive torque on-demand to the normally non-driven wheels in response to low traction conditions.

Additional objects, features and advantages of the present invention will become apparent from studying the following detailed description and appended claims when taken in conjunction with the accompanying drawings.

DETAILED DESCRIPTION OF THE PREFERRED EMBODIMENTS

In general, the present invention relates to a planetary gear assembly and a synchronized range shift mechanism installed in a transfer case of the type used in the drivetrain of a four-wheel drive vehicle and which permit "on-the-move" shifting of the transfer case between a low-range drive mode and a high-range drive mode during motive operation of the motor vehicle.

Figure 1:
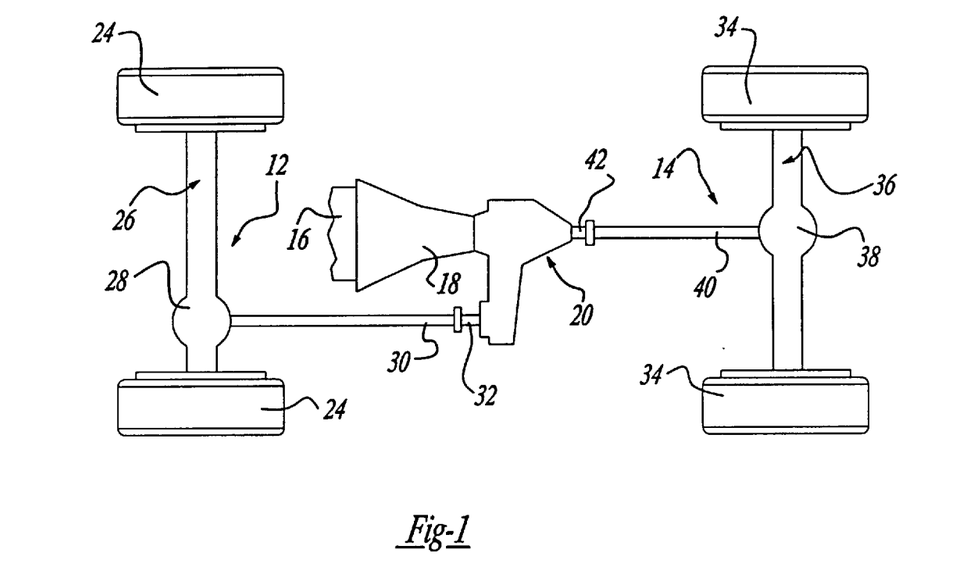
FIG. 1 illustrates the drivetrain of a four-wheel drive motor vehicle equipped with any of the transfer cases of the present invention.

With particular reference to FIG. 1 of the drawings, a drivetrain 10 for a four-wheel drive vehicle is shown.

Drivetrain 10 includes a front driveline 12 and a rear driveline 14 both drivable from a source of power, such as an engine 16, through a transmission 18 which may be of either the manual or automatic type. In the particular embodiment shown, drivetrain 10 is a four-wheel drive system which incorporates a transfer case 20 for transmitting drive torque from engine 16 and transmission 18 to front driveline 12 and rear driveline 14. Front driveline 12 is shown to include a pair of front wheels 24 connected at opposite ends of a front axle assembly 26 having a front differential 28 that is coupled to one end of a front propshaft 30, the opposite end of which is coupled to a front output shaft 32 of transfer case 20. Similarly, rear driveline 14 includes a pair or rear wheels 34 connected at opposite ends of a rear axle assembly 36 having a rear differential 38 coupled to one end of a rear propshaft 40, the opposite end of which is interconnected to a rear output shaft 42 of transfer case 20.

Transfer case 20 includes a housing assembly 44 and an input shaft 46 rotatably supported from housing assembly 44. Input shaft 46 is adapted for connection to an output shaft (not shown) of transmission 18 such that both are rotatably driven by engine 16 of the motor vehicle. As seen, rear output shaft 42 is rotatably supported between input shaft 46 and housing 44 while front output shaft 32 is rotatably supported from housing 44. Transfer case 20 is also shown to include a planetary gear assembly 48, a synchronized range shift mechanism 50, and an interaxle differential 52. Planetary gear assembly 48 includes a ring gear 54 fixed to housing assembly 44, a sun gear 56 fixed for rotation with input shaft 46, and a set of pinion gears 58 which are each rotatably supported on a pinion shaft 60 and meshed with sun gear 56 and ring gear 54. Each pinion shaft 60 extends between a front carrier ring 62 and a rear carrier ring 64 which are interconnected to define a planet carrier 66.

Planetary gear assembly 48 functions as a two-speed gear reduction unit which, in conjunction with a range clutch 68 of synchronized range shift mechanism 50, is operable to establish either of a first or second drive connection between input shaft 46 and a carrier assembly 70 of interaxle differential 52. To establish the first drive connection, carrier assembly 70 is coupled by range clutch 68 for common rotation with input shaft 46. Thus, the first drive connection defines a high-range drive mode in which carrier assembly 70 is driven at a first (i.e., direct) speed ratio with respect to input shaft 46. Likewise, the second drive connection is established by range clutch 68 coupling carrier assembly 70 for common rotation with planet carrier 66. The second drive connection defines a low-range drive mode in which carrier assembly 70 is driven at a second (i.e., reduced) speed in response to driven rotation of input shaft 46. A Neutral mode is established when range clutch 68 uncouples carrier assembly 70 from both input shaft 46 and planet carrier 66. As will be detailed, synchronized range shift mechanism 50 is operable for permitting transfer case 20 to be shifted "on-the-move" between its high-range and low-range drive modes.

Interaxle differential 52 functions to permit speed differentiation and distribute drive torque between front output shaft 32 and rear output shaft 42 so as to establish a differentiated or "full-time" four-wheel drive mode. As will be detailed, carrier assembly 70, when driven at either of the first and second speed ratios, acts as the input to interaxle differential 52. Interaxle differential 52 also includes a gearset 72 with outputs coupled to front output shaft 32 and rear output shaft 42. According to the particular embodiment shown in FIGS. 2 and 3, gearset 72 includes a second sun gear 74, a third sun gear 76, a first set of pinions 78 meshed with second sun gear 74, and a second set of pinions (not shown) meshed with third sun gear 76. The pinions are arranged in meshed pairs within a chamber 80 formed in carrier assembly 70. As such, second sun gear 74 acts as a first output and is fixed for rotation with rear output shaft 42. Likewise, third sun gear 76 acts as a second output and is fixed for rotation, via a transfer mechanism 82, with front output shaft 32. Transfer mechanism 82 is shown to include a drive sprocket 84 rotatably supported on rear output shaft 42, a driven sprocket 86 fixed to front output shaft 32, and a power transfer device, such as chain 88, interconnecting driven sprocket 86 to drive sprocket 84. If desired, a geared arrangement can be used in place of chain 88 to interconnect driven sprocket 86 to drive sprocket 84. Third sun gear 76 is fixed to a transfer shaft 90 which, in turn, is fixed to, or integral with, drive sprocket 84. According to the particular embodiment shown, differential 52 is a limited-slip device capable of progressively and automatically limiting excessive speed differentiation between sun gears 74 and 76 due to thrust loading and frictional loading generated by gearset 72 in response to speed differentiation. It should be understood that any type of traditional open differential or limited-slip differential (speed and/or torque sensitive) can be used in substitution for the particular construction shown. As seen, carrier assembly 70 defines a drum housing 92 within which gearset 72 is retained and which is rotatably supported between rear output shaft 42 and transfer shaft 90.

Figure 2:
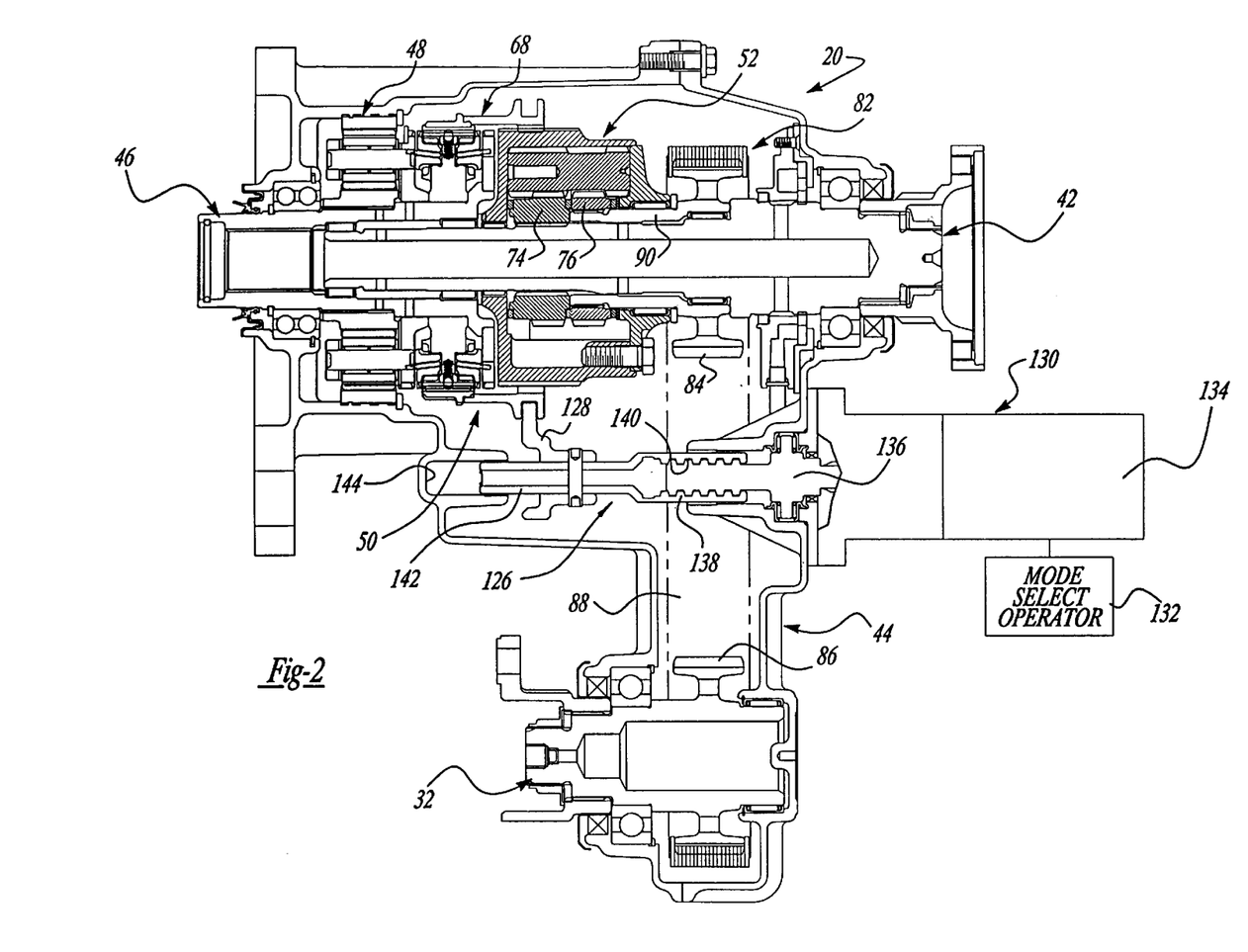
FIG. 2 is a sectional view of a transfer case equipped with a planetary gear assembly and a synchronized range shift mechanism according to the present invention.
Figure 3:
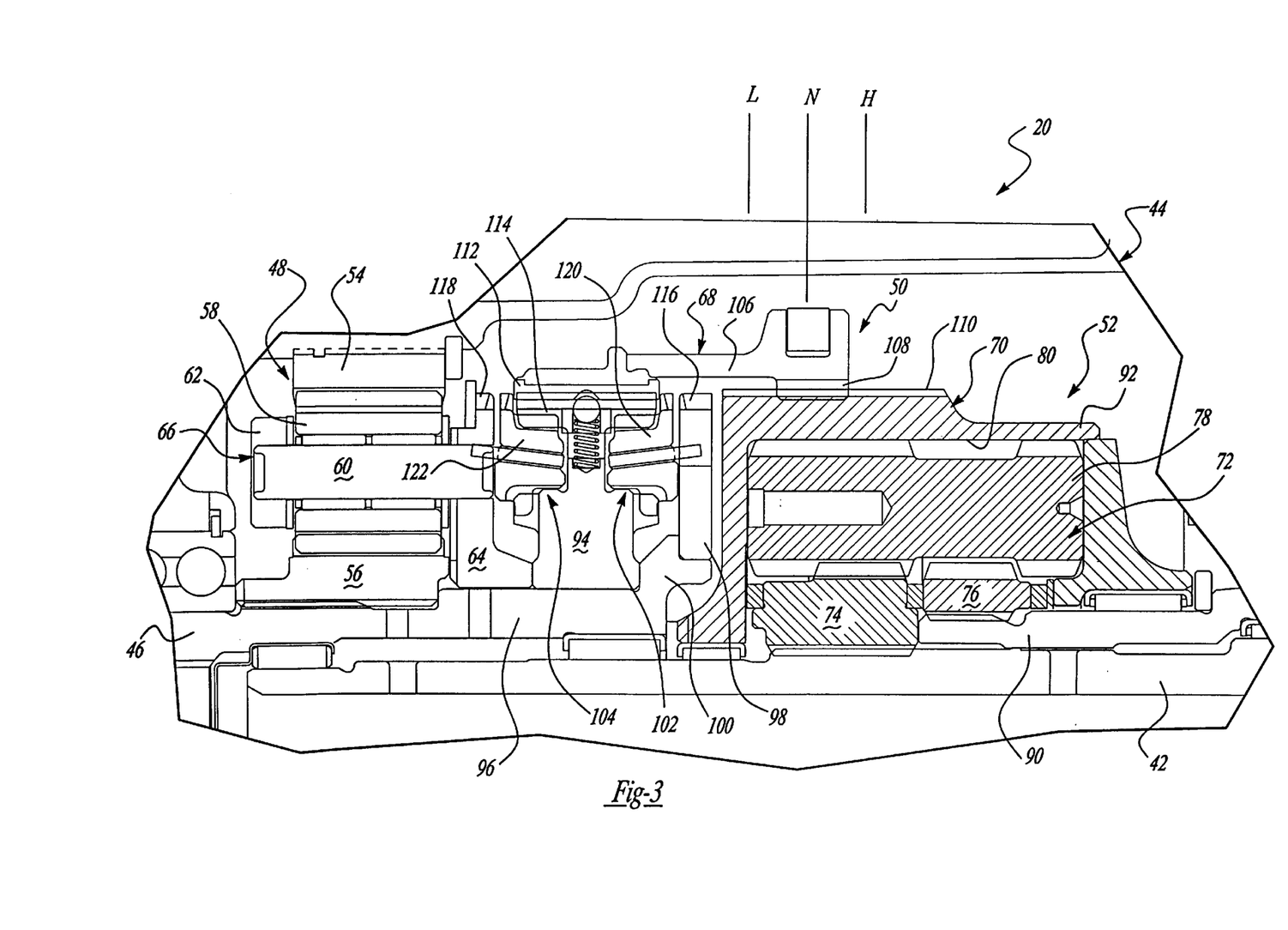
FIG. 3 is a partial sectional view of the planetary gear assembly and the synchronized range shift mechanism shown in FIG. 2.

With continued reference to FIGS. 2 and 3, synchronized range shift mechanism 50 is shown to include a clutch hub 94 rotatably supported on a tubular segment 96 of input shaft 46, a clutch plate or ring 98 fixed to an annular end segment 100 of input shaft 46, a first synchronizer assembly 102 disposed between clutch hub 94 and clutch ring 98, and a second synchronizer assembly 104 deposed between hub 94 and carrier ring 64. Carrier ring 64 is shown journalled on tubular segment 96 of input shaft 46 with clutch hub 94 axially restrained between end segment 100 and carrier ring 64. Range clutch 68 is a range sleeve 106 having a first set of internal clutch teeth 108 maintained in constant mesh with external teeth 110 formed on drum housing 92 of interaxle differential 52. Range sleeve 106 also includes a second set of internal clutch teeth 112 maintained in constant mesh with external teeth 114 formed on clutch hub 94. Thus, range sleeve 106 is mounted for rotation with drum housing 92 and clutch hub 94 and is supported for bi-directional sliding movement relative thereto.

With range sleeve 106 in a neutral position (denoted by position line "N"), its second set of clutch teeth 112 are disengaged from meshed engagement with clutch teeth 116 on clutch ring 98 and clutch teeth 118 on rear carrier ring 64. First synchronizer assembly 102 is operable for causing speed synchronization between input shaft 46 and carrier assembly 70 in response to movement of range sleeve 106 from its N position toward a high-range position (denoted by position line "H"). Once the speed synchronization process is completed, clutch teeth 112 on range sleeve 106 are permitted to move through the teeth of a blocker ring 120 and into meshed engagement with clutch teeth 116 on front clutch ring 98. Accordingly, with range sleeve 106 positioned in its H position, it couples drum housing 92 to clutch ring 98 such that carrier assembly 70 of interaxle differential 52 is coupled to rotate at the same speed as input shaft 46 for establishing the first drive connection therebetween. Thus, when the first drive connection is established, a full-time four-wheel high-range drive mode is established.

Second synchronizer assembly 104 is operable to cause speed synchronization between range sleeve 106 and planet carrier 66 in response to movement of range sleeve 106 from its N position toward a low-range position (denoted by position line "L"). Once speed synchronization is complete, clutch teeth 112 on range sleeve 106 move through teeth on a blocker ring 122 and into meshed engagement with clutch teeth 118 on carrier ring 64. With range sleeve 106 positioned in its L position, sun gear 56 drives pinion gears 58 about stationary ring gear 54 such that planet carrier 66 and carrier assembly 70 are driven at the reduced speed ratio relative to input shaft 46, thereby establishing the second drive connection and the full-time four-wheel low-range drive mode. When range sleeve 106 is in its N position, no drive torque is transferred to carrier assembly 70, thereby establishing the Neutral mode. Range sleeve 106 is designed such that its sets of clutch teeth 108 and 112 maintain respective engagement with teeth 110 on drum 92 and teeth 114 on clutch hub 94 throughout the entire length of axial travel of range sleeve 106 between its H and L positions.

To provide means for moving range sleeve 106 between its three range positions, transfer case 20 includes a shift system 126 comprised of a range fork 128 coupled to range sleeve 106, an actuator 130 for causing axial movement of range fork 128, and a mode select operator 132 for causing selective actuation of actuator 130. As shown in FIG. 2, actuator 130 is a gearmotor/encoder assembly 134 having a rotary output screw 136 formed with external threads 138 that mesh with internal threads 140 formed in one end of a sector shaft 142, the other end of which is supported in a housing socket 144. Range fork 128 is fixed to shaft 142 such that bi-directional rotation of output screw 136 caused by actuation of actuator 130 results in bi-directional axial translation of shaft 142 and range fork 128, thereby moving range sleeve 106 between its three distinct range positions. The direction and amount of rotation of output screw 136 is controlled in response to an electric control signal sent to gearmotor/encoder assembly 134 when the vehicle operator selects a desired drive mode via manipulation of mode select operator 132. The vehicle operator is permitted to select from full-time four-wheel high-range and low-range drive modes and the Neutral mode. Mode select operator 132 can be a gearshift lever or push-button/rotary switches. However, it is contemplated that any manually-actuated or power operated shift system known for use in conventional two-speed transfer cases can be used in place of the particular arrangement shown.

Figure 4:
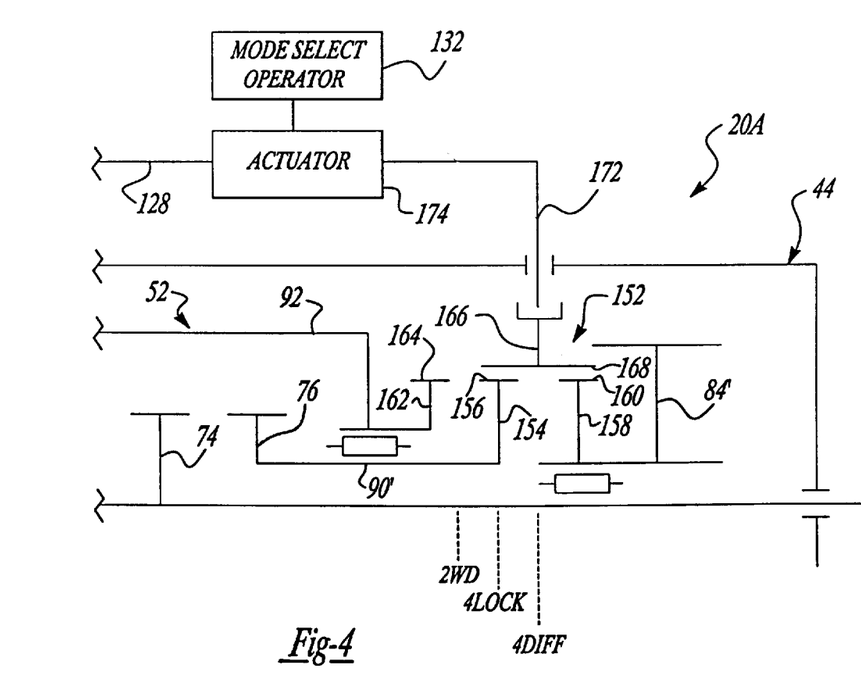
FIG. 4 is a schematic illustration of a portion of the transfer case shown in FIG. 2 optionally equipped with a mode clutch mechanism.

Referring now to FIG. 4, a transfer case 20A is shown as a modified version of transfer case 20 optionally equipped to include a mode shift mechanism 150 permitting selection of a non-differentiated or "locked" four-wheel drive mode and a two-wheel drive mode in addition to the full-time four-wheel drive mode. To accommodate mode shift mechanism 150, transfer shaft 90' is now shown to be supported for rotation relative to drive sprocket 84'. Mode shift mechanism 150 includes a mode clutch 152 which is operable for selectively coupling transfer shaft 90' to drive sprocket 84' for establishing the full-time four-wheel drive mode. Mode clutch 152 is also operable for selectively coupling transfer shaft 90' to drive sprocket 84' and drum housing 92 for establishing the "locked" four-wheel drive mode in which speed differentiation is inhibited between front output shaft 32 and rear output shaft 42. Finally, mode clutch 152 is operable for selectively uncoupling drive sprocket 84' from transfer shaft 90' while coupling transfer shaft 90' to drum housing 92 for establishing the two-wheel drive mode in which all drive torque is delivered to rear output shaft 42.

Mode clutch 152 includes a driven hub 154 fixed to transfer shaft 90' on which external teeth 156 are formed, a first clutch plate 158 fixed to drive sprocket 84' having external clutch teeth 160 formed thereon, and a second clutch plate 162 fixed to drum housing 92 and having clutch teeth 164 formed thereon. Mode clutch 152 also includes a mode sleeve 166 having a set of internal splines 168 which are in constant mesh with external teeth 156 of driven hub 154 such that mode sleeve 166 can be slid axially relative thereto. With mode sleeve 166 in a first or full-time four-wheel drive mode position, denoted by position line "4DIFF", its spline teeth 168 are in meshed engagement with clutch teeth 160 on first clutch plate 158 and disengaged from clutch teeth 164 on second clutch plate 162. In this first mode position, transfer shaft 90' is coupled to drive sprocket 84' such that driven rotation of drum housing 92 causes drive torque to be distributed between second sun gear 74 and third sun gear 76 and respectively between rear output shaft 42 and front output shaft 32 while permitting speed differentiation therebetween, thereby establishing the full-time four-wheel drive mode.

Axial movement of mode sleeve 166 from its 4DIFF position to a second or locked four-wheel drive mode position, denoted by position line "4LOCK", maintains engagement of clutch teeth 160 with mode sleeve teeth 168 and causes teeth 168 to further engage clutch teeth 164 on second clutch plate 162. In this second mode position, relative rotation between second sun gear 74 and third sun gear 76 is prevented for likewise preventing speed differentiation between rear output shaft 42 and front output shaft 32, thereby establishing the locked four-wheel drive mode. Further axial movement of mode sleeve 166 from its 4LOCK mode position to a third or two-wheel drive mode position, denoted by position line "2WD", causes teeth 168 on mode sleeve 166 to disengage clutch teeth 160 on first clutch plate 158 and engage clutch teeth 164 on second clutch plate 162. In this third mode position, drive sprocket 84' is uncoupled from transfer shaft 90' while relative rotation is prevented between second sun gear 74 and third sun gear 76, thereby transmitting all drive torque to rear output shaft 42 for establishing the two-wheel drive mode. Thus, in both of the 4LOCK and 2WD mode positions, interaxle differential 52 is mechanically locked for preventing speed differentiation.

Figure 5:
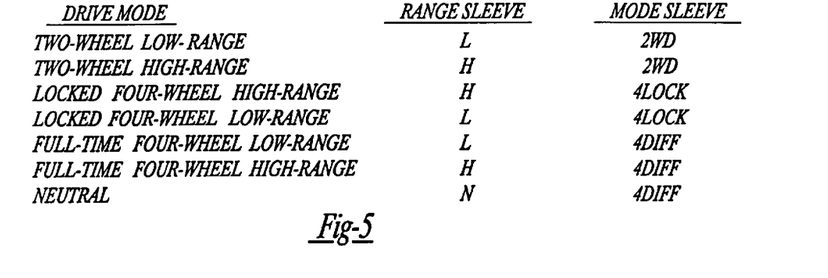
FIG. 5 is a table listing the drive modes available with the transfer case of FIG. 4.

Referring still to FIG. 4, the shift system associated with transfer case 20A is shown to additionally include a mode fork 172 coupling mode sleeve 166 to an actuator 174. Actuator 174 can be any suitable device that is operable to cause coordinated axial movement of range sleeve 106 and mode sleeve 166 in response to a particular drive mode selected by the vehicle operator through mode select operator 132. Alternatively, actuators 130 and 174 can be a pair of independently controlled shift devices that are separately connected to shift forks 128 and 172, respectively. Preferably, however, actuator 174 is a rotatable sector plate having range and mode camming arrangements for facilitating coordinated axial movement of shift forks 128 and 172 in a manner generally similar to that described in commonly owned U.S. Pat. No. 5,076,112. The sector plate can be rotated manually in response to actuation of a gearshift lever or, in the alternative, via a power-operated device actuated in response to signals from push buttons or rotary switches. The table in FIG. 5 lists the combinations of positions for range sleeve 106 and mode sleeve 166 to establish the various drive modes that are available with transfer case 20A. However, the invention is not limited to the listed sequence nor is it necessary that all seven of the drive modes be made available. In particular, the number of drive modes made available for selection via actuation of operator can be selected based on the particular requirements of each different vehicular application.

Figure 6:
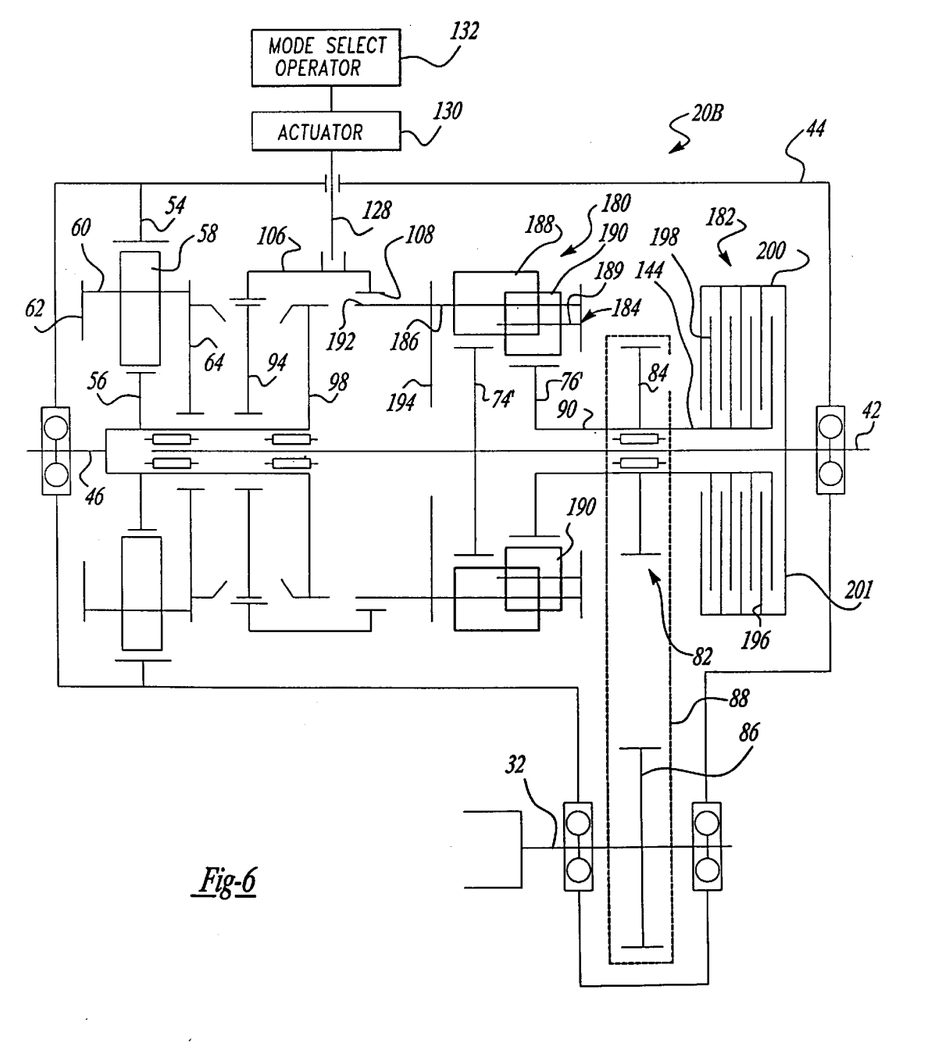
FIG. 6 is a schematic illustration of a transfer case according to an alternative embodiment of the present invention.

Referring to FIG. 6, a transfer case 20B is shown equipped with an interaxle differential 180 in place of interaxle differential 52, and a biasing clutch 182 in place of mode clutch 152. Differential 180 includes a carrier assembly 184 having long pinion shafts 186 on which long pinions 188 are rotatably supported, and short pinion shafts 189 on which short pinions 190 are rotatably supported. Long pinions 188 mesh with second sun gear 74' and short pinions 190 mesh with third sun gear 76'. Pairs of long pinions 188 and short pinions 190 are meshed. As such, torque delivered to carrier assembly 184 is delivered to rear output shaft 42 and front output shaft 32 through sun gears 74' and 76' while facilitating speed differentiation to establish the full-time four-wheel drive modes. As seen, teeth 108 on range sleeve 106 are maintained in constant meshed engagement with external teeth 192 formed on a front carrier plate 194 of carrier assembly 184. Thus, movement of range sleeve 106 between its H, N and L positions establish the high-range, neutral and low-range speed ratios previously described.

To provide means for controlling torque distribution and speed differentiation between front and rear output shafts 32 and 42, respectively, transfer case 20B includes biasing clutch 182. Biasing clutch 182 is normally operable in a non-actuated mode for permitting speed differentiation between front output shaft 32 and rear output shaft 42, thereby establishing the full-time four-wheel drive mode. Biasing clutch 182 is also operable in a fully-actuated mode for establishing the locked four-wheel drive mode in which speed differentiation is inhibited between front output shaft 32 and rear output shaft 42. Biasing clutch 182 can progressively regulate the torque bias and speed differentiation automatically between its non-actuated and fully-actuated modes in response to and as a function of the amount of relative rotation (i.e., interaxle slip) between front output shaft 32 and rear output shaft 42. The torque versus slip characteristics of biasing clutch 182 can be tuned to meet specific vehicular applications. Biasing clutch 182 is a hydromechanical coupling and includes a clutch pack having alternately interleaved clutch plates 196 and 198 mounted respectively for rotation with a drum 200 and transfer shaft 90. Drum 200 includes a rear end plate 201 that is fixed to rear output shaft 42. A clutch engagement force operable for transferring torque to the slower turning clutch plate, can, for example, be generated in response to viscous shear (i.e., viscous couplings), hydraulic pressure (i.e., geared traction units) or in any other manner known in torque transfer devices. If desired, a mode shift mechanism similar to that previously described could be positioned between drum 200 and rear output shaft 42 for selectively preventing rotation therebetween and permitting selection of either full-time or locked four-wheel drive modes.

Figure 7:
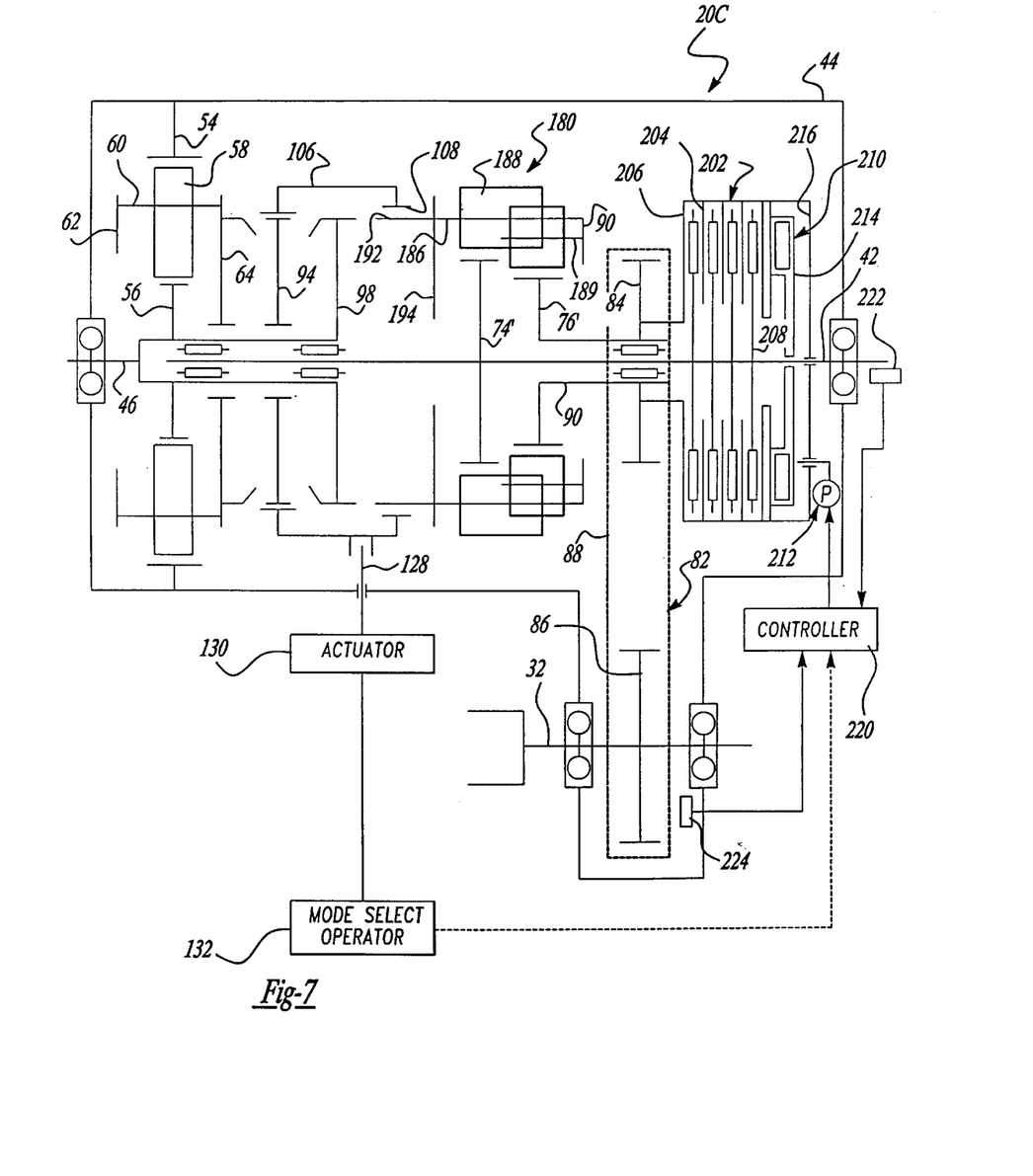
FIG. 7 is a schematic illustration of a modified version of the transfer case shown in FIG. 6.

FIG. 7 illustrates a transfer case 20C which is a modified version of transfer case 20B. In particular, transfer case 20C is equipped with a biasing clutch 202 having a set of outer clutch plates 204 fixed to a drum assembly 206 which is fixed for rotation with drive sprocket 84, and a set of inner clutch plates 208 fixed for rotation with rear output shaft 42 and alternatively interleaved with outer clutch plates 156 to define a clutch pack. Biasing clutch 202 further includes a thrust mechanism 210 for exerting a clutch engagement force on the clutch pack and an actuator 212 for controlling the magnitude of the clutch engagement force as a function of the amount of interaxle slip. In particular, thrust mechanism 210 includes a piston 214 which is axially movable within a pressure chamber 216 of biasing clutch 202 for movement relative to the clutch pack. As shown, actuator 212 is a pump which supplies high pressure hydraulic fluid from a sump to pressure chamber 216 for controlling the axial position of piston 214 relative to the clutch pack and, as such, the clutch engagement force exerted thereon. Pump 212 can be a shaft driven device, such as a gerotor pump or a gear pump, in which the output pressure generated and supplied to pressure chamber 216 is proportional to the speed difference between front output shaft 32 and rear output shaft 42. With such a shaft-driven pump 212, the position of piston 214 in pressure chamber 216 and the clutch engagement force exerted on the clutch pack is progressive and is likewise generally proportional to the speed difference between output shafts 32 and 42. Alternatively, the output pressure generated by pump 212 can be adaptively controlled using a control system having a controller 220 which receives input signals from various vehicle sensors such as, for example, a rear speed sensor 222 and a front speed sensor 224. Controller 220 determines the real time value of the speed difference from the sensor signals supplied by speed sensors 222 and 224 and sends a control signal to electric pump 212 which regulates its output pressure as a function of the control signal. With either arrangement, valving could be used to tune the clutch engagement characteristic of piston 214 in chamber 216 and return springs to return piston 214 to a released position relative to the clutch pack.

Controller 220 can be programmed to control actuation of biasing clutch 202 pursuant to an ON/Off control scheme. In such an arrangement, biasing clutch 202 is normally maintained in an non-actuated state to permit speed differentiation between front and rear output shafts 32 and 42, respectively. In this state, transfer case 20C is defined as operating in its full-time four-wheel drive mode. However, when the sensor input signals indicate a vehicular condition exceeding a predetermined value, biasing clutch 200 is fully actuated for "locking" front and rear output shafts 32 and 42 against relative rotation whereby they are, in effect, rigidly coupled for establishing the locked four-wheel drive mode. As noted, the vehicular condition preferably used for controlling actuation of biasing clutch 202 is related to the speed differential between front output shaft 32 and rear output shaft 42. Thereafter, biasing clutch 200 is returned to its non-actuated state when the sensor input signals indicate that the magnitude of the vehicular condition is less than a predetermined value.

Alternatively, controller 220 can be programmed in accordance with an ADAPTIVE control scheme to regulate the actuated condition of biasing clutch 202 between its non-actuated and fully-actuated limits for varying the magnitude of speed differentiation and drive torque transmitted across differential 180 as a function of the sensor input signals. In operation, biasing clutch 202 increases the amount of drive torque delivered to the slower turning output shaft while concurrently decreasing the drive torque delivered to the faster turning output shaft in an amount equal to the torque capacity of the clutch at a given actuated state. In either of the above-noted control schemes, control over actuation of biasing clutch 200 is automatic and does not require any act or mode selection on the part of the vehicle operator. Under both control schemes, the process of monitoring vehicle conditions and controlling clutch engagement is continuous and automatic. If transfer case 20C is equipped with the electrically-controlled hydraulic system then mode select operator 132 permits the vehicle driver to select between full-time four-wheel high-range and low-range modes with automatic clutch control, locked four-wheel high-range and low-range drive modes, and the Neutral mode. In the progressive systems, a mode lock-out clutch can be provided to selectively couple drum 206 to rear output shaft 42 to establish locked four-wheel drive modes.

Figure 8:
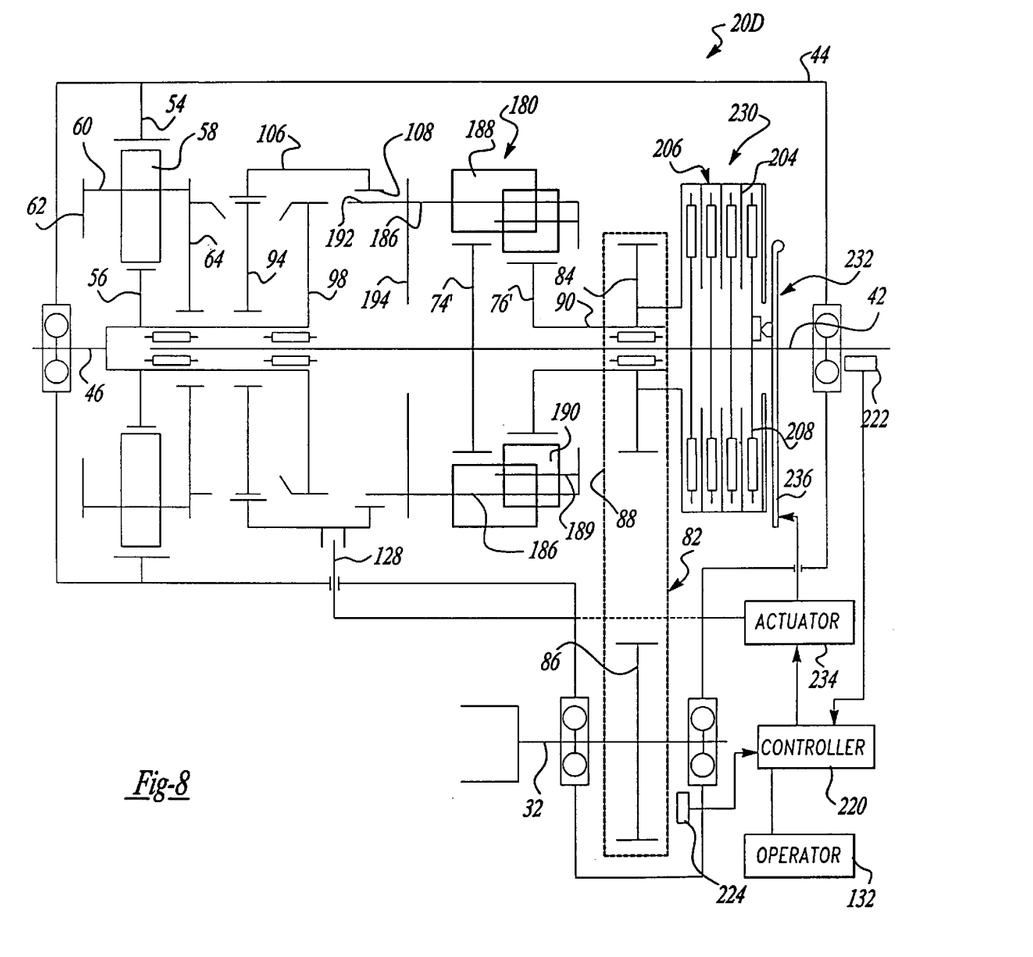
FIG. 8 is a schematic illustration of another modified version of the transfer case shown in FIG. 6.

FIG. 8 illustrates a transfer case 20D equipped with a mechanically-actuated biasing clutch 230. In particular, biasing clutch 230 is an electronically-controlled controlled clutch assembly operably disposed between front output shaft 32 and rear output shaft 42 to automatically control the magnitude of the speed differentiation and modify the torque distribution ratio therebetween. Biasing clutch 230 has a thrust mechanism 232 for exerting a clutch engagement force on the clutch pack with an actuator 234 controlling the magnitude of the clutch engagement force as a function of the value of interaxle slip. In particular, thrust mechanism 232 includes a pivotable lever arm assembly 236. Again, controller 220 controls the frictional biasing applied by biasing clutch 230 in response to a control signal generated based on the value of the sensor input signals. Preferably, actuator 234 facilitates coordinated movement of range sleeve 106 and lever arm assembly 236 to permit the vehicle operator to select, via actuation of operator 132, full-time four-wheel high-range and low-range drive modes, a neutral mode, and locked four-wheel high-range and low-range drive modes. In the full-time four-wheel drive modes, biasing clutch 230 is controlled automatically under either of the ON/OFF or ADAPTIVE schemes. When one of the locked four-wheel drive modes is selected, biasing clutch 230 is held in its fully-actuated state. Obviously, the mode selections described above can also be made available with biasing clutch 230 of transfer case 20D if operator 132 supplies controller 220 with a signal indicating the particular mode selected.

Figure 9:
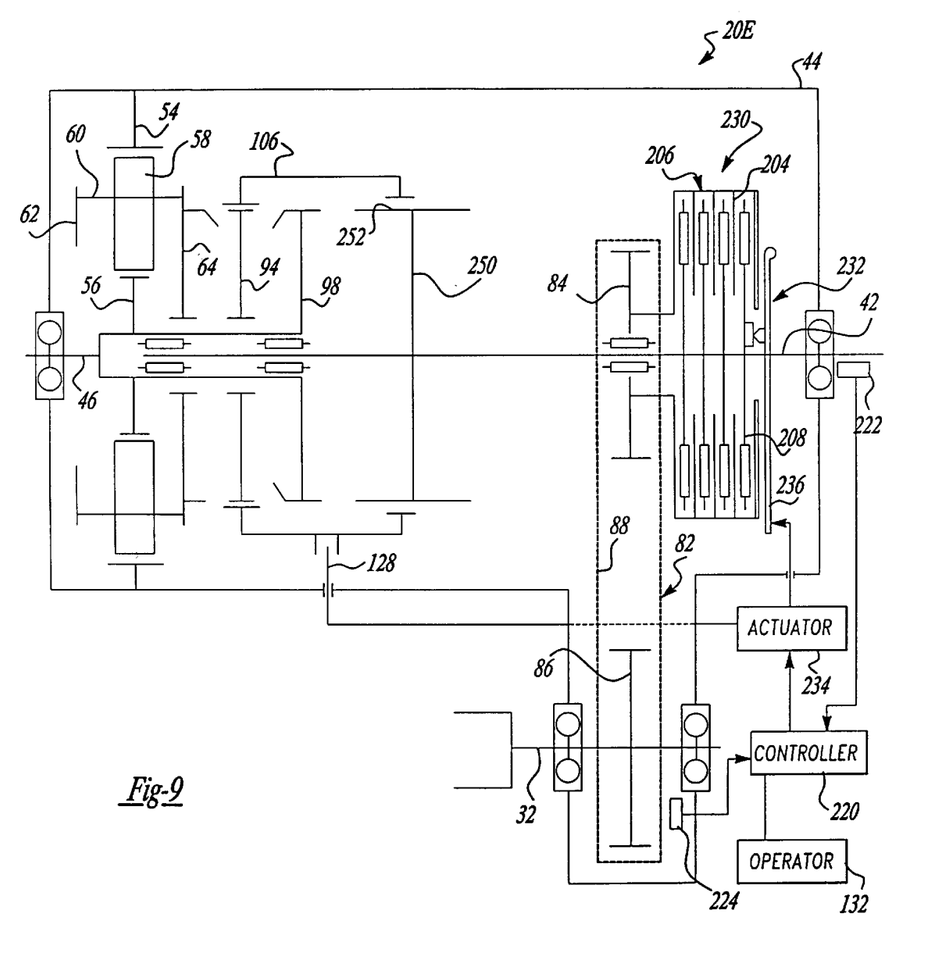
FIG. 9 is a schematic illustration of a modified version of the transfer case shown in FIG. 8.

Finally, FIG. 9 illustrates a transfer case 20E wherein planetary gear assembly 48 and synchronized range shift mechanism 50 are installed in an "on-demand" four-wheel drive arrangement with biasing clutch 230 installed to transfer drive torque from rear output shaft 42 to front output shaft 32 in response to low traction conditions. In this arrangement, interaxle differential 180 is replaced with a driven hub 250 fixed for rotation with rear output shaft 42 and having external teeth 252 in constant mesh with teeth 108 on range sleeve 106. As such, range sleeve 106 is movable to establish the high-range and low-range drive connections between rear output shaft 42 and input shaft 46. Biasing clutch 230 is again controlled automatically, as previously described. If the vehicle operator selects a two-wheel drive mode, biasing clutch is maintained in its non-actuated state. When a locked four-wheel drive mode is selected, biasing clutch 230 is held in its fully actuated state. When an on-demand mode is selected, controlled 220 regulates the torque transferred by varying biasing clutch 230 between its non-actuated and fully-actuated states.

The foregoing discussion discloses and describes various embodiment of the present invention. One skilled in the art will readily recognize from such discussion, and from the accompanying drawings and claims, that various changes, modifications and variations can be made therein without departing from the true spirit and fair scope of the invention as defined in the following claims.

What is claimed is:

1. A planetary gear assembly comprising:
   a rotary input member;
   a rotary output member;
   a stationary ring gear;
   a sun gear fixed for rotation with said input member;
   a carrier;
   a pinion gear rotatably supported from said carrier and meshed with said ring gear and said sun gear;
   a clutch plate fixed for rotation with said input member;
   a clutch hub rotatably supported on said input member between said carrier and said clutch plate;
   a range sleeve having a first segment coupled for rotation with said hub and a second segment coupled for rotation with said output member, said range sleeve is supported on said clutch hub and said output member for sliding movement between first and second positions, said range sleeve is operable in its first position to engage said clutch plate such that said output member is driven by said input member at a first speed ratio, and said range sleeve is operable in its second position to engage said carrier such that said output member is driven by said input member at a second speed ratio;
   a first synchronizer operable for synchronizing the rotary speed of said output member to that of said clutch plate in response to movement of said range sleeve to its first position;
   a second synchronizer operable for synchronizing the rotary speed of said output member to said carrier in response to movement of said range sleeve to its second position; and
   a shift member for moving said range sleeve between its first and second positions.

2. The planetary gear assembly of claim 1 wherein said first synchronizer is disposed between said clutch hub and said clutch plate for inhibiting movement of said range sleeve into its first position until speed synchronization is established therebetween, and wherein said second synchronizer is disposed between said clutch hub and said carrier for inhibiting movement of said range sleeve to its second position until speed synchronization is established therebetween.

3. The planetary gear assembly of claim 2 wherein said first segment of said range sleeve includes a first set of clutch teeth maintained in constant mesh with teeth on said clutch hub, and said second segment of said range sleeve includes a second set of clutch teeth maintained in constant mesh with teeth on said output member, and wherein said range sleeve is operable in its first position to cause said first set of clutch teeth to meshingly engage clutch teeth on said clutch plate and is operable in its second position to cause said first set of clutch teeth to meshingly engage clutch teeth on said carrier.

4. The planetary gear assembly of claim 3 wherein said carrier includes a carrier ring rotatably supported on said input member and on which said carrier clutch teeth are formed.

5. The planetary gear assembly of claim 1 wherein said input member is an input shaft of a transfer case and said output member is an output shaft of said transfer case.

6. The planetary gear assembly of claim 5 further comprising a driven hub fixed for rotation with said output shaft, and wherein said first segment of said range sleeve includes first clutch teeth maintained in constant mesh with teeth on said clutch hub, and said second segment of said range sleeve includes second clutch teeth maintained in constant mesh with said driven hub, said range sleeve is operable in its first position to cause said first clutch teeth to meshingly engage clutch teeth on said clutch plate and is operable in its second position to cause said first clutch teeth to meshingly engage clutch teeth on said carrier.

7. The planetary gear assembly of claim 6 wherein said carrier includes a carrier ring rotatably supported on said input member and on which said carrier clutch teeth are formed.

8. A transfer case comprising:

an input shaft;

first and second output shafts;

a planetary gear assembly including a stationary ring gear, a sun gear fixed for rotation with said input shaft, a carrier, and a pinion gear rotatably supported from said carrier and meshed with said ring gear and said sun gear;

a clutch plate fixed for rotation with said input shaft;

a clutch hub rotatably supported on said input shaft between said carrier and said clutch plate;

a range sleeve having a first segment coupled for rotation with said clutch hub and a second segment coupled for rotation with said first output shaft, said range sleeve being supported on said clutch hub and said first output shaft for sliding movement between first and second positions, said range sleeve is operable in its first position to engage said clutch plate such that said first output shaft is driven by said input shaft at a first speed ratio, and said range sleeve is operable in its second position to engage said carrier such that said first output shaft is driven by said input shaft at a second speed ratio;

a first synchronizer operable for synchronizing the rotary speed of said first output shaft to that of said clutch plate in response to movement of said range sleeve to its first position;

a second synchronizer operable for synchronizing the rotary speed of said first output shaft to that of said carrier in response to movement of said range sleeve to its second position;

a shift member for moving said range sleeve between its first and second positions; and a transfer mechanism for transferring drive torque from said first output shaft to said second output shaft.

9. The transfer case of claim 8 wherein said transfer mechanism includes a drive sprocket rotatably supported from said first output shaft, a driven sprocket fixed for rotation with said second output shaft, a transfer device interconnecting said driven sprocket to said drive sprocket, and a clutch for coupling said drive sprocket to said first output shaft.

10. The transfer case of claim 9 wherein said clutch is a mode clutch operable for selectively coupling said drive sprocket to said first output shaft to establish a part-time four-wheel drive mode, said mode clutch is operable for selectively uncoupling said drive sprocket from said first output shaft to establish a two-wheel drive mode.

11. The transfer case of claim 9 wherein said clutch is a biasing clutch operable for automatically coupling said drive sprocket to said first output shaft to establish an on-demand four-wheel drive mode in response to excessive speed differentiation between said first and second output shafts, and said biasing clutch is normally operable for uncoupling said drive sprocket from said first output shaft to establish a two-wheel drive mode.

12. The transfer case of claim 8 wherein said first synchronizer is disposed between said clutch hub and said clutch plate for inhibiting movement of said range sleeve into its first position until speed synchronization is established therebetween, and wherein said second synchronizer is disposed between said clutch hub and said carrier for inhibiting movement of said range sleeve to its second position until speed synchronization is established therebetween.

13. The transfer case of claim 8 further comprising a driven hub fixed for rotation with said first output shaft, and wherein said first segment of said range sleeve includes first clutch teeth maintained in constant mesh with teeth on said clutch hub, and said second segment of said range sleeve includes second clutch teeth maintained in constant mesh with said driven hub, said range sleeve is operable in its first position to cause said first clutch teeth to meshingly engage clutch teeth on said clutch plate and is operable in its second position to cause said first clutch teeth to meshingly engage clutch teeth on said carrier.

14. The transfer case of claim 13 wherein said carrier includes a carrier ring rotatably supported on said input shaft and on which said carrier clutch teeth are formed.

15. A transfer case comprising:

an input shaft;

first and second output shafts;

a planetary gear assembly including a stationary ring gear, a sun gear fixed for rotation with said input shaft, a carrier, and a pinion gear rotatably supported from said carrier and meshed with said ring gear and said sun gear;

a clutch plate fixed for rotation with said input shaft;

a clutch hub rotatably supported on said input shaft between said carrier and said clutch plate;

an interaxle differential having an input member, a first output member coupled to said first output shaft, a second output member coupled to said second output shaft, and a gearset for transferring drive torque from said input member to said first and second output members while permitting speed differentiation therebetween;

a range sleeve having a first segment coupled for rotation with said clutch hub and a second segment coupled for rotation with said input member of said interaxle differential, said range sleeve is supported for sliding movement between first and second positions such that said range sleeve is operable in its first position to engage said clutch ring such that said input member of said interaxle differential is driven by said input shaft at a first speed ratio, and said range sleeve is operable in its second position to engage said carrier such that said input member of said interaxle differential is driven by said input shaft at a second speed ratio;

a first synchronizer operable for synchronizing the rotary speed of said input member of said interaxle differential to that of said clutch plate in response to movement of said range sleeve to its first position;

a second synchronizer operable for synchronizing the rotary speed of said input member of said interaxle differential to that of said carrier in response to movement of said range sleeve to its second position; and a shift mechanism for moving said range sleeve between said first and second positions.

16. The transfer case of claim 15 further comprising a clutch for controlling torque distribution between said first and second output members of said interaxle differential.

17. The transfer case of claim 16 wherein said clutch comprises a mode clutch operable for selectively coupling any two of said input member and first and second output members of said interaxle differential to establish a locked four-wheel drive mode, and said mode clutch is further operable for uncoupling said two members of said interaxle differential to establish a full-time four-wheel drive mode.

18. The transfer case of claim 16 wherein said clutch is a biasing clutch including a clutch pack of interleaved clutch plates alternatively coupled for rotation with any two members of said interaxle differential, and a mechanism for exerting a clutch engagement force on said clutch pack to bias the torque distribution between said first and second output shafts in response to speed differentiation therebetween.

19. The transfer case of claim 18 wherein said mechanism includes a thrust plate engageable with said clutch pack and an actuator controlling movement of said thrust plate as a function of a speed differential signal supplied to a controller.

* * * * *